United States Patent
Xu et al.

(10) Patent No.: US 11,381,833 B2
(45) Date of Patent: Jul. 5, 2022

(54) METHOD AND APPARATUS FOR VIDEO CODING

(71) Applicant: Tencent America LLC, Palo Alto, CA (US)

(72) Inventors: Xiaozhong Xu, State College, PA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 20 days.

(21) Appl. No.: 16/401,147

(22) Filed: May 2, 2019

(65) Prior Publication Data
US 2020/0029088 A1 Jan. 23, 2020

Related U.S. Application Data

(60) Provisional application No. 62/700,754, filed on Jul. 19, 2018.

(51) Int. Cl.
| | |
|---|---|
| *H04N 19/176* | (2014.01) |
| *H04N 19/513* | (2014.01) |
| *H04N 19/139* | (2014.01) |
| *H04N 19/105* | (2014.01) |

(52) U.S. Cl.
CPC ......... *H04N 19/513* (2014.11); *H04N 19/105* (2014.11); *H04N 19/139* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 7,237,240 B1 * | 6/2007 | Chen | G06F 11/3438 718/100 |
| 8,526,495 B2 | 9/2013 | Liu et al. | |
| 9,049,452 B2 | 6/2015 | Liu et al. | |
| 9,510,012 B2 | 11/2016 | Liu et al. | |
| 9,813,726 B2 | 11/2017 | Liu et al. | |
| 9,823,975 B2 * | 11/2017 | Li | G06F 3/064 |
| 10,951,913 B2 * | 3/2021 | Lee | H04N 19/56 |

(Continued)

OTHER PUBLICATIONS

Zhang, CE4-related: History-based Motion Vector Prediction JVET K0104 (Year: 2018).*

(Continued)

*Primary Examiner* — Shadan E Haghani
(74) *Attorney, Agent, or Firm* — ArentFox Schiff LLP

(57) ABSTRACT

Aspects of the disclosure provide methods and apparatuses for video encoding and decoding. In some examples, an apparatus for video decoding includes processing circuitry. The processing circuitry is configured to select, from a history buffer that includes multiple pieces of motion information of previously decoded blocks, at least one motion vector prediction (MVP) candidate to be included in a MVP candidate list for a current block based on frequencies that the multiple pieces of motion information are used in predicting the previously decoded blocks. The processing circuitry further determines a current piece of motion information of the current block based on the MVP candidate list and reconstructs at least one sample of the current block based on the current piece of motion information.

9 Claims, 14 Drawing Sheets

(56) References Cited

U.S. PATENT DOCUMENTS

| | | | |
|---|---|---|---|
| 2013/0177083 A1* | 7/2013 | Chen | H04N 19/52 |
| | | | 375/240.16 |
| 2018/0310018 A1* | 10/2018 | Guo | H04N 19/70 |
| 2019/0205530 A1* | 7/2019 | Brown | G06F 21/552 |
| 2020/0036997 A1* | 1/2020 | Li | H04N 19/577 |
| 2020/0059658 A1* | 2/2020 | Chien | H04N 19/176 |

OTHER PUBLICATIONS

High Efficiency Video Coding, Rec. International Telecommunication Union, ITU-T H.265 v4, Dec. 2016.

JEM reference software, https://jvet.hhi.fraunhofer.de/svn/svn_HMJEMSoftware/.

Jingning Han, Yaowu Xu, and James Bankoski, "A dynamic motion vector referencing scheme for video coding", ICIP, Sep. 2016.

J. Ye, X. Li, S. Liu, "Merge mode modification on top of Tencent's software in response to CfP", JVET-J0058, San Diego, USA, Apr. 2018.

L.Zhang, K.Zhang, H. Liu, Y. Wang, P. Zhao, D. Hong, "CE4-related: History-based Motion Vector Prediction", JVET-K0104, Ljubljana, SI, Jul. 2018.

H. Yang, et al, "Description of CE4: Inter prediction and motion vector coding", ISO/IEC JTC1/SC29/WG11 JVET-J1024, 2018.

Xu, et al, "CE2: Test 3.2: Intra BC merge mode with default candidates", ISO/IEC JTC1/SC29/WG11 JCTVC-T0073, 2015.

* cited by examiner

| [0] | [1] | [2] | [3] | [4] | [5] | [6] | [7] |
|---|---|---|---|---|---|---|---|
| (0,0) | (2,1) | (0,0) | (-1,-1) | (0,0) | (0,5) | (2,1) | (2,0) |

FIG. 11A

| 7 | 6 | 5 | 4 | 3 |
|---|---|---|---|---|
| (2,0) | (2,1) | (0,5) | (0,0) | (-1,-1) |
| 1 | 2 | 1 | 3 | 1 |

FIG. 11B

| (0,3) | (2,-1) | (0,2) | (-1,-1) | (0,0) | (0,5) | (2,1) | (2,0) |
|---|---|---|---|---|---|---|---|
| 1 | 1 | 3 | 2 | 1 | 2 | 3 | 1 |
| [0] | [1] | [2] | [3] | [4] | [5] | [6] | [7] |

METHOD AND APPARATUS FOR VIDEO CODING

INCORPORATION BY REFERENCE

This present disclosure claims the benefit of priority to U.S. Provisional Application No. 62/700,754, "Methods and Apparatus for Ordering History-Based Motion Vector Prediction Candidates" filed on Jul. 19, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to select, from a history buffer that includes multiple pieces of motion information of previously decoded blocks, at least one motion vector prediction (MVP) candidate to be included in a MVP candidate list for a current block based on frequencies that the multiple pieces of motion information are used in predicting the previously decoded blocks. The processing circuitry further determines a current piece of motion information of the current block based on the MVP candidate list and reconstructs at least one sample of the current block based on the current piece of motion information.

In an embodiment, the processing circuitry determines the frequencies based on numbers of occurrences of the multiple pieces of motion information in the history buffer and selects a subset of the multiple pieces of motion information with largest ones of the numbers of occurrences in the history buffer.

In an embodiment, the processing circuitry determines the frequencies based on numbers of occurrences of the multiple pieces of motion information in the history buffer. The history buffer includes a first set of the multiple pieces of motion information where the number of occurrences of each piece of motion information in the first set is larger than a non-negative integer N. Further, the processing circuitry selects a subset of the multiple pieces of motion information from the first set.

In an embodiment, the processing circuitry selects a subset of the multiple pieces of motion information with largest numbers of occurrences in M most recently stored pieces of motion information in the history buffer where M is a positive integer.

In an embodiment, the processing circuitry selects a subset of the multiple pieces of motion information from a first set of M most recently stored pieces of motion information in the history buffer where each piece of motion information in the first set occurs more than N times in the M most recently stored pieces of motion information. N is a non-negative integer and M is a positive integer.

In an embodiment, the history buffer stores a value indicating the frequency of each of the multiple pieces of motion information. When the current piece of motion information is different from the multiple pieces of motion information, the processing circuitry stores the current piece of motion information and a value indicating a frequency of the current piece of motion information in the history buffer where the frequency is 1. In an example, the processing circuitry further removes one of the multiple pieces of motion information with a lowest one of the frequencies. When the current piece of motion information is one of the multiple pieces of motion information, the processing circuitry updates the value to indicate an increase of the frequency of the one of the multiple pieces of motion information by 1.

In an embodiment, the history buffer stores a value indicating the frequency of each of the multiple pieces of motion information. In an example, the processing circuitry selects a subset of the multiple pieces of motion information with largest ones of the frequencies in the history buffer. In an example, the processing circuitry selects a subset of the multiple pieces of motion information from a first set of the multiple pieces of motion information where the frequency of each piece of motion information in the first set is larger than a non-negative integer N. In an example, the processing circuitry selects a subset of the multiple pieces of motion information that is most frequently used in M most recently stored pieces of motion information in the history buffer where M is a positive integer. In an example, the processing circuitry selects a subset of the multiple pieces of motion information from a first set of M most recently stored pieces of motion information in the history buffer where the frequency of each piece of motion information in the first set is larger than a non-negative integer N. In an example, the processing circuitry further resets the values to indicate that the frequencies of the multiple pieces of motion information in the history buffer are 1 when the current block is to be decoded first in one of: a new coding tree block, a new row of the coding tree block, a new slice of the coding tree block, a new tile of the coding tree block, and a new wavefront parallel processing row of the coding tree block. In an example, the processing circuitry further resets one of the values to indicate that one of the frequencies in the history buffer is 1 when the one of the frequencies exceeds a threshold.

BRIEF DESCRIPTION OF THE DRAWINGS

Further features, the nature, and various advantages of the disclosed subject matter will be more apparent from the following detailed description and the accompanying drawings in which:

FIG. 11A shows an example of a HMVP buffer according to an embodiment of the disclosure.

FIG. 11B shows motion vectors and respective numbers of occurrences in a HMVP buffer according to an embodiment of the disclosure.

FIG. 12 shows an example of a HMVP buffer according to an embodiment of the disclosure.

DETAILED DESCRIPTION OF EMBODIMENTS

Figure 1:
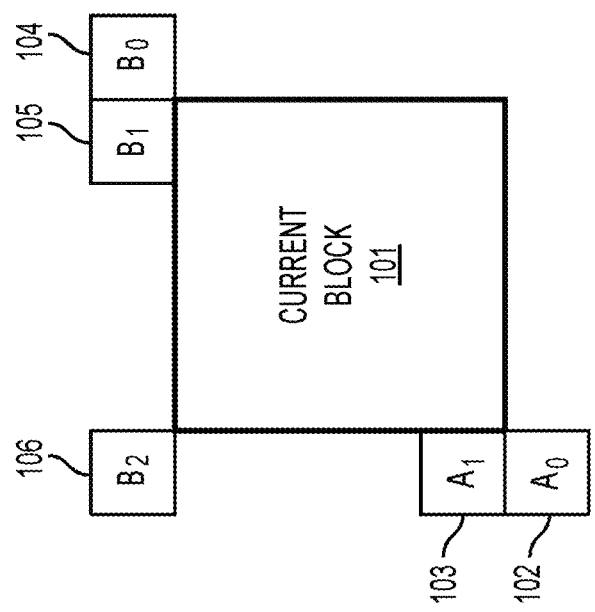
FIG. 1 is a schematic illustration of a current block and its surrounding spatial merge candidates in one example.
Figure 2:
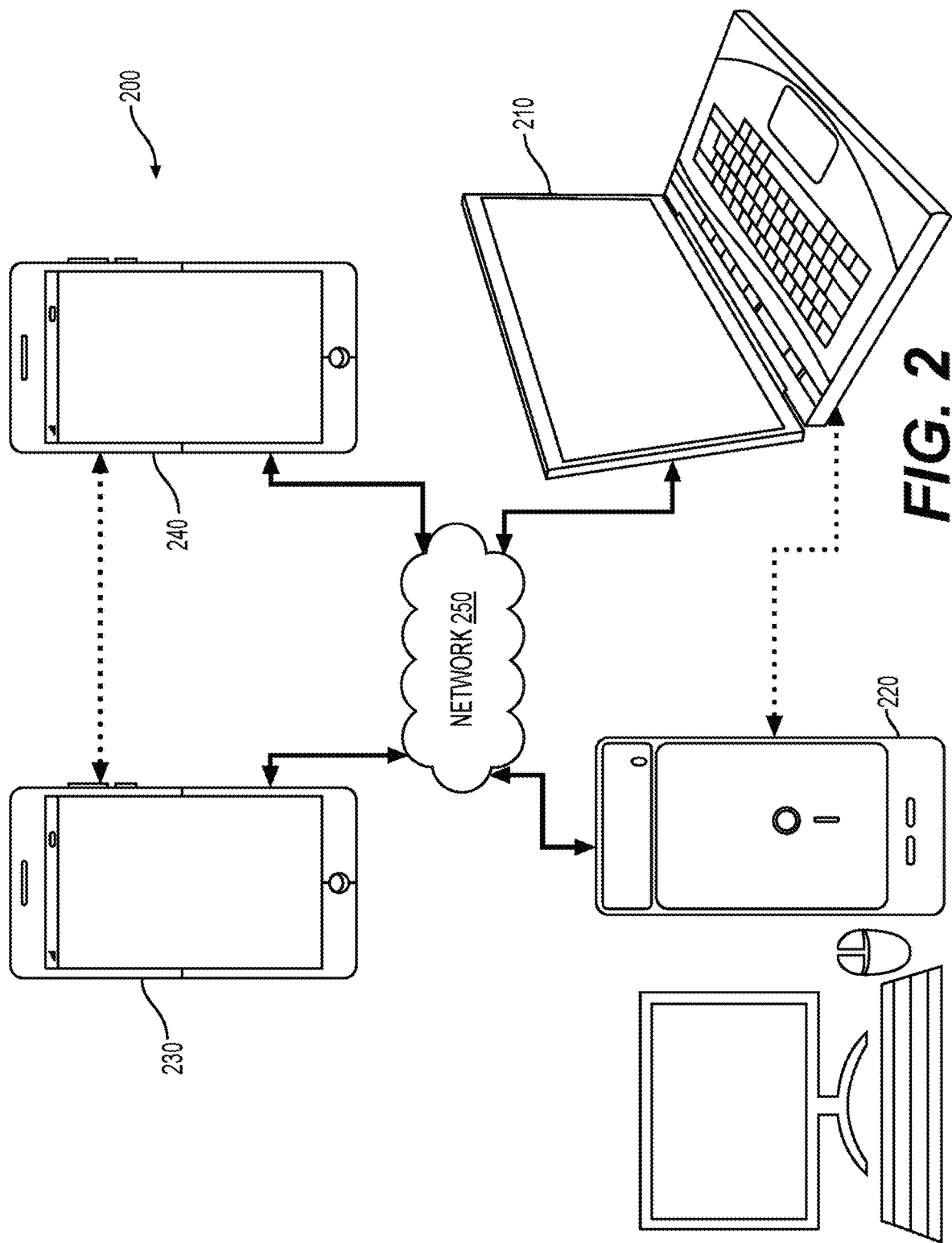
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240)

that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
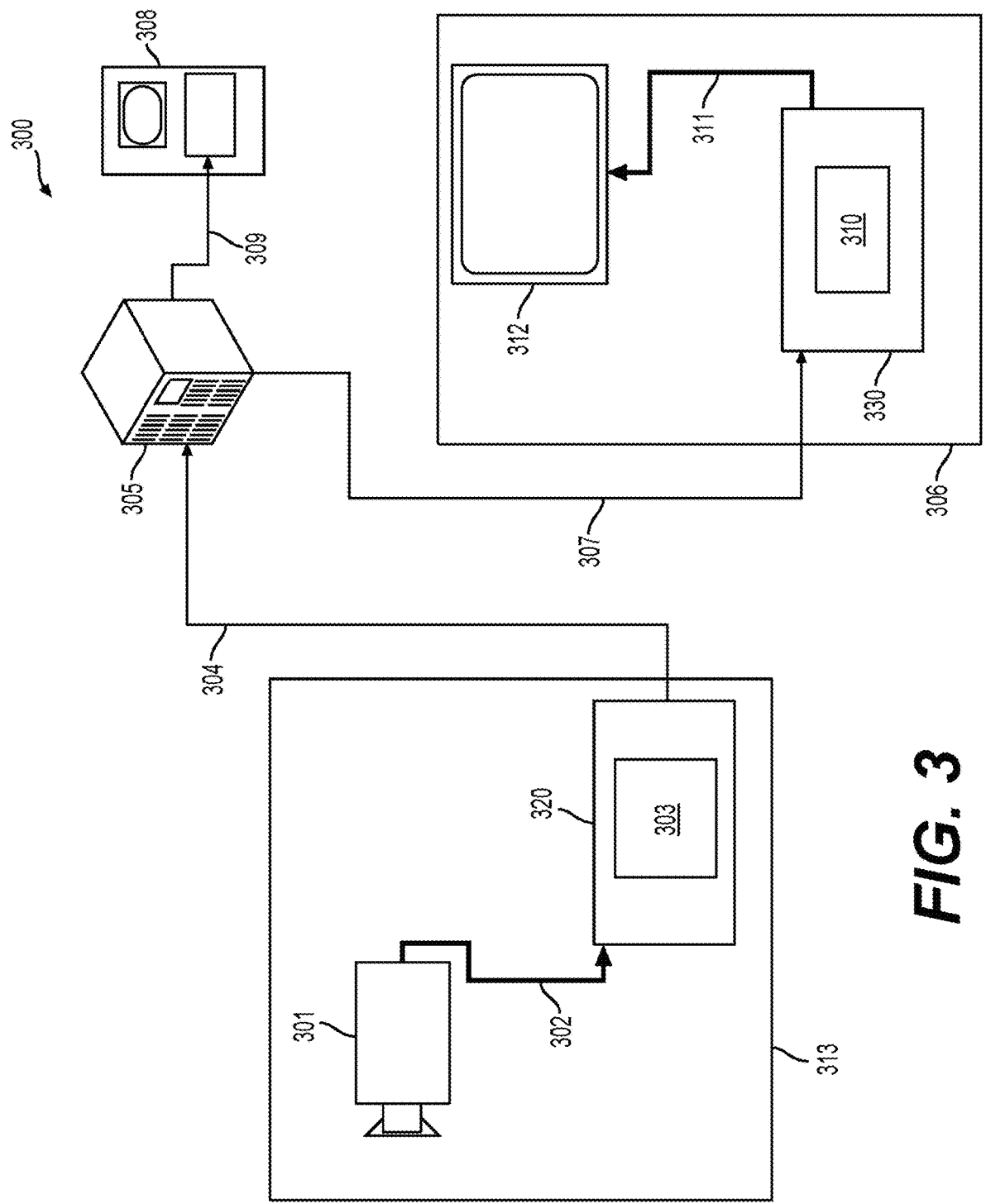
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
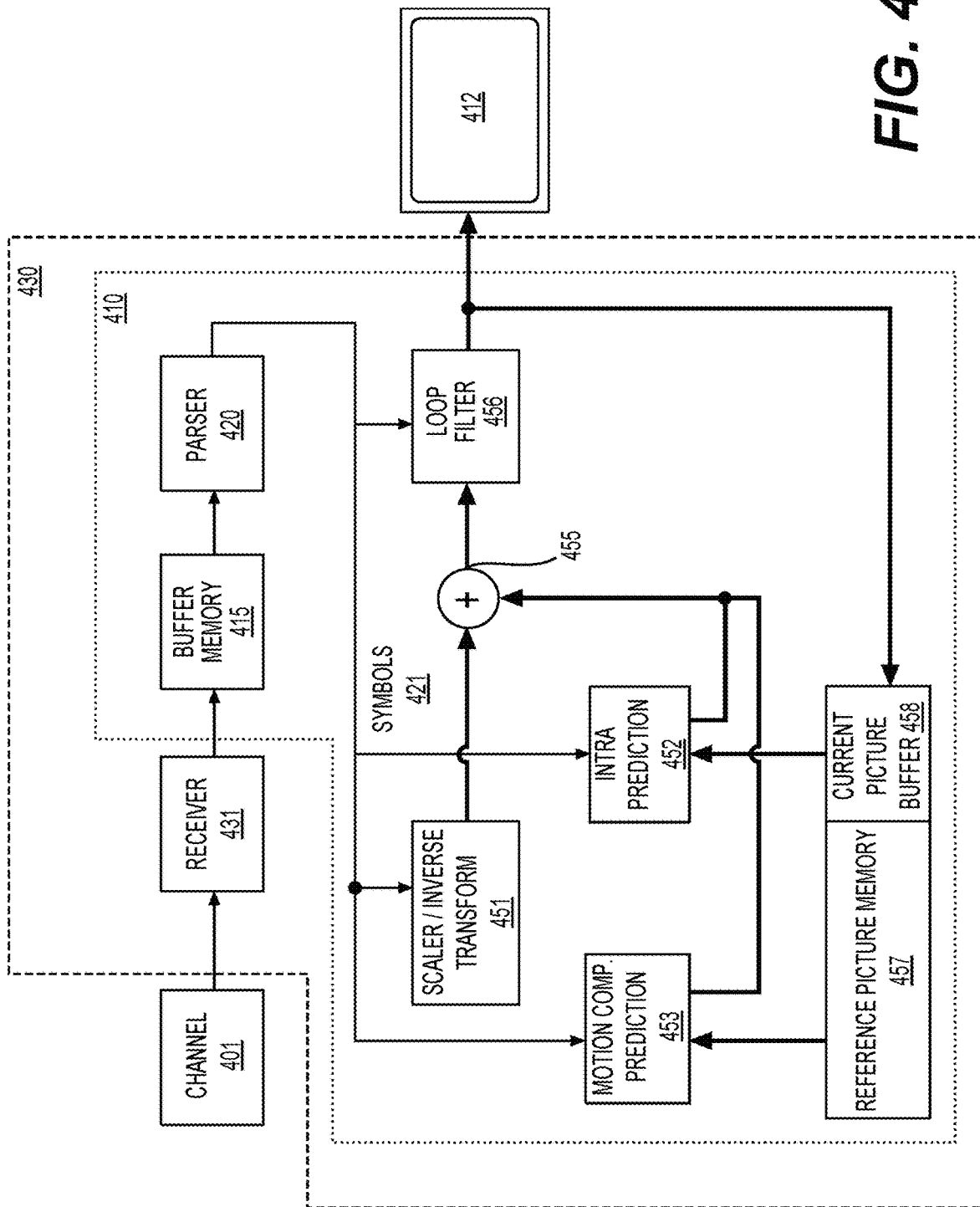
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
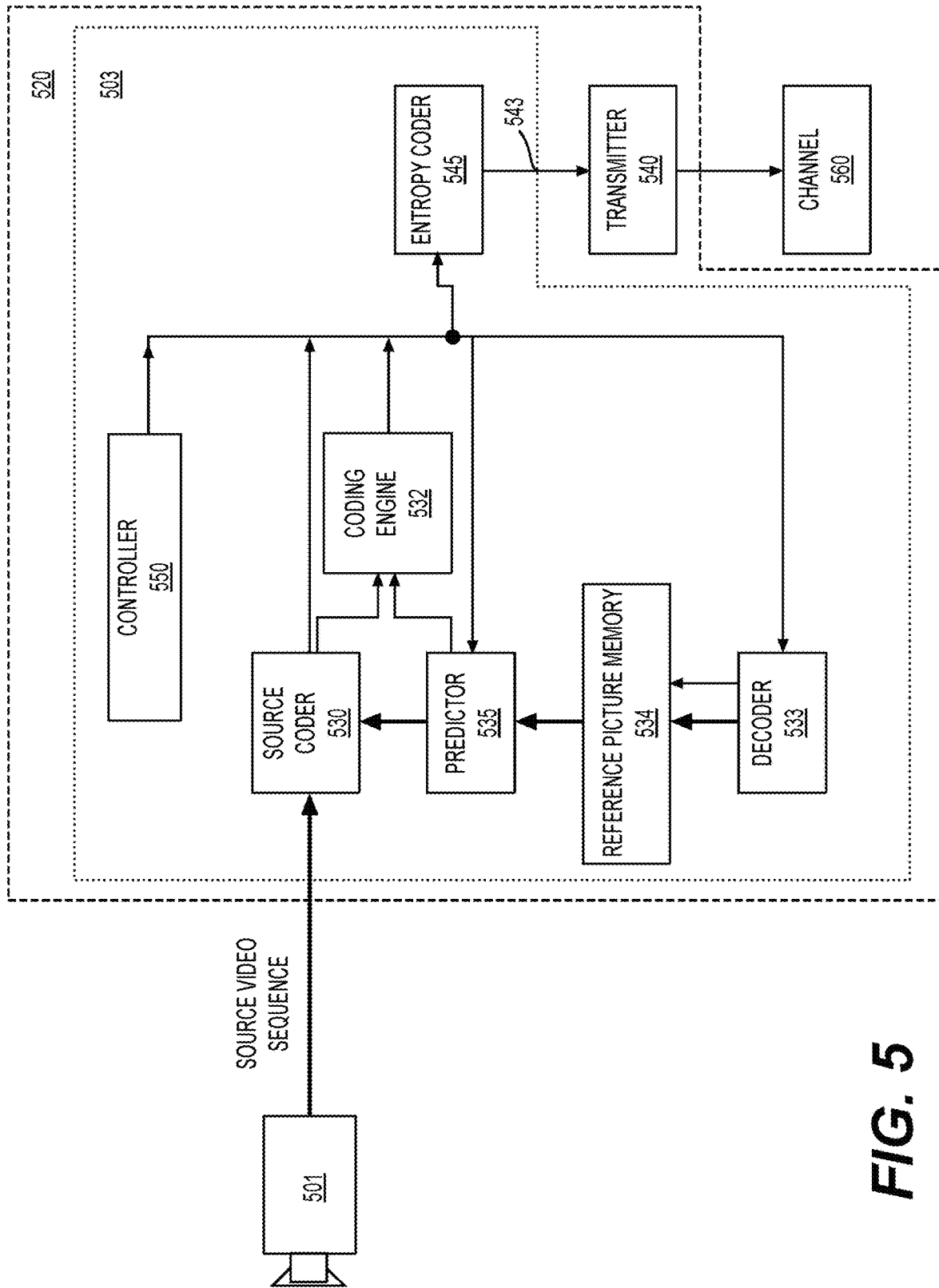
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
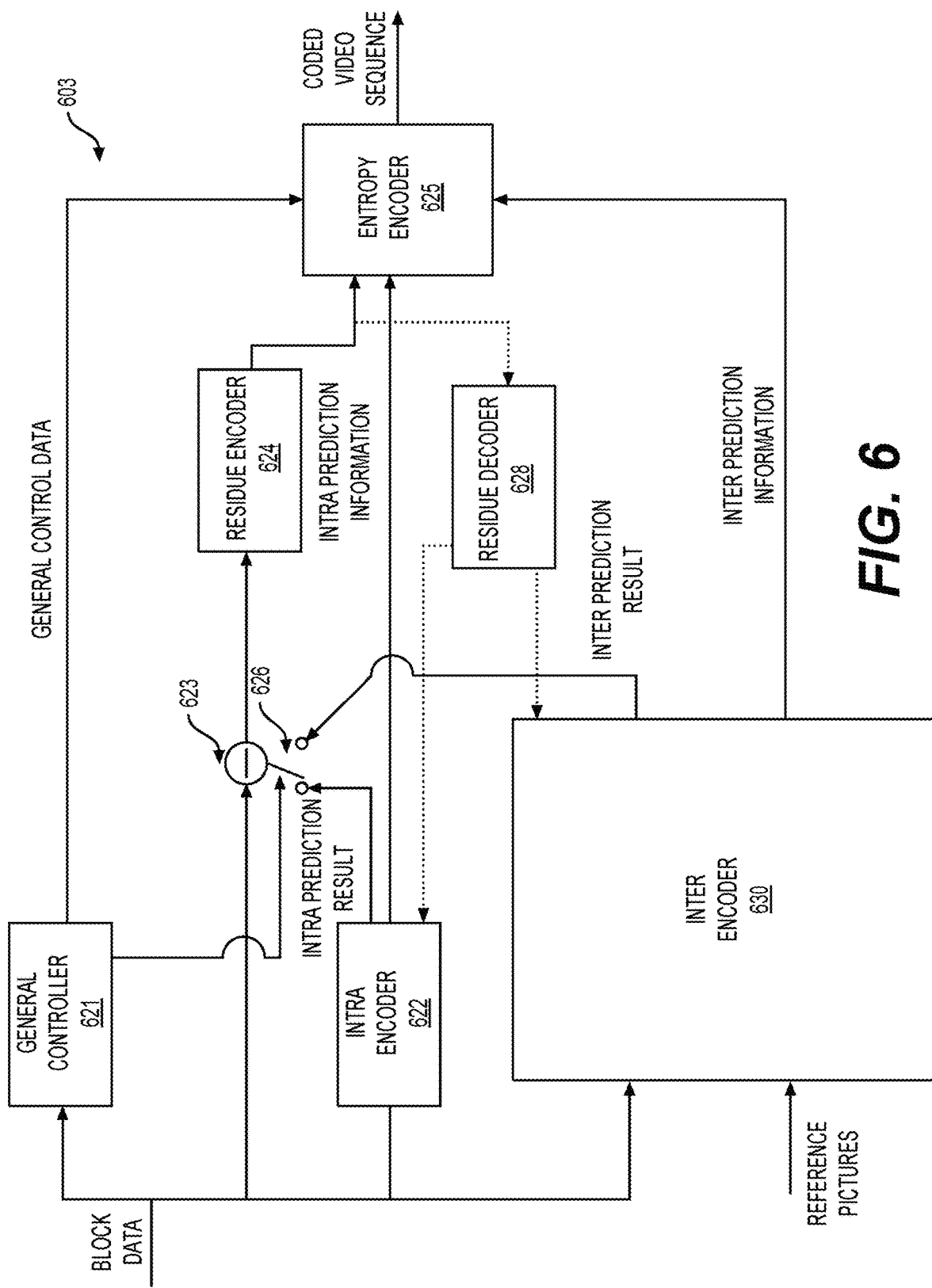
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
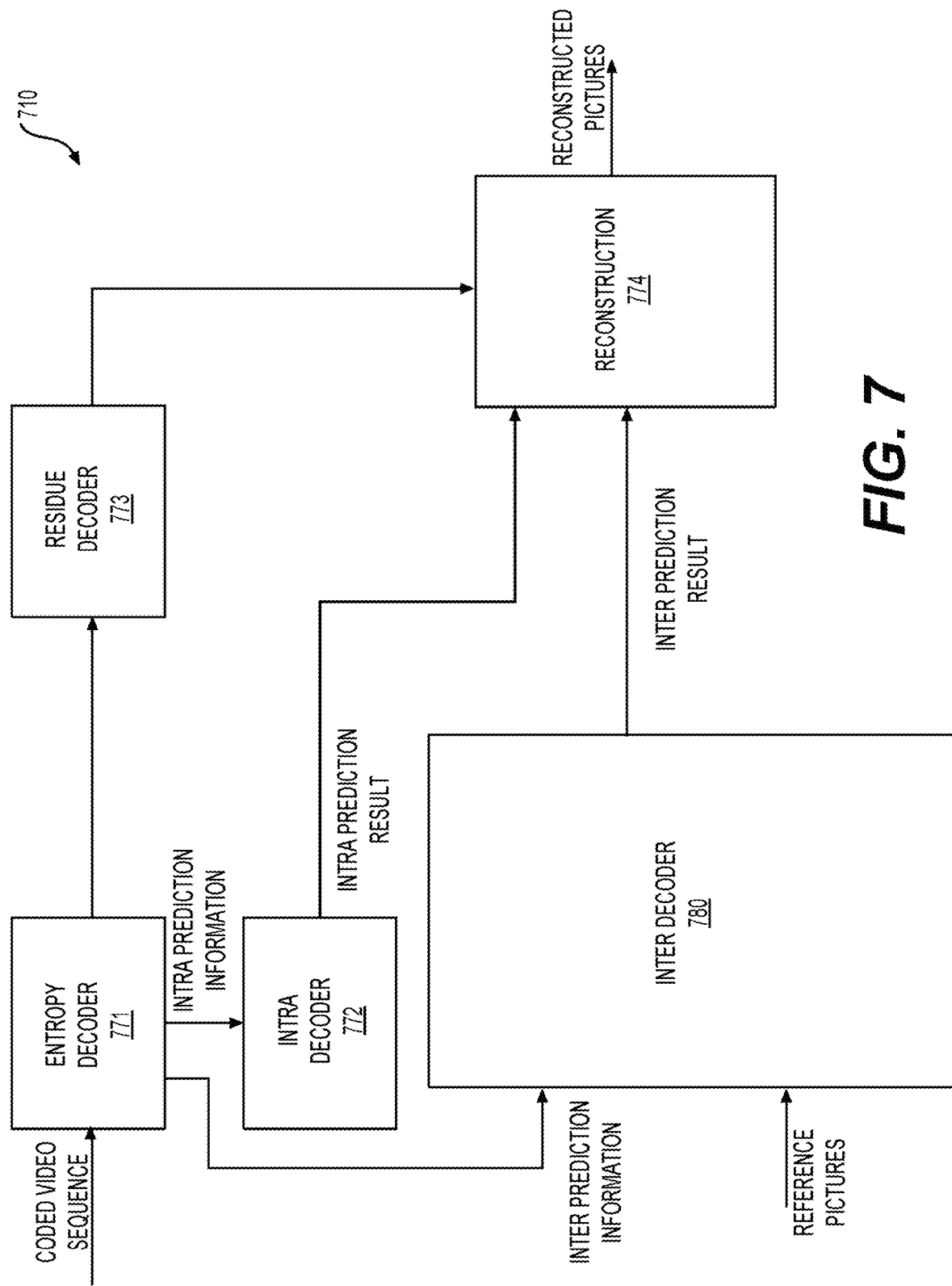
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide methods and apparatuses for selecting motion vector prediction candidates from a history-based motion vector prediction buffer.

According to some embodiments, a MV for a current block can be coded either in an explicit way, to signal a difference between a MV predictor and the MV, or in an implicit way, to be indicated as derived from one previously coded or generated MV. Alternatively, a MV pair can be coded either in the explicit or implicit way when a bi-directional prediction is used. The explicit coding of a MV can be referred to as an Advanced Motion Vector Prediction (AMVP) or a residue mode. The implicit coding of a MV may be referred to as a merge mode (or an inter merge mode), in which the current block is merged into a previously coded block by sharing motion information of the previously coded block.

Figure 8:
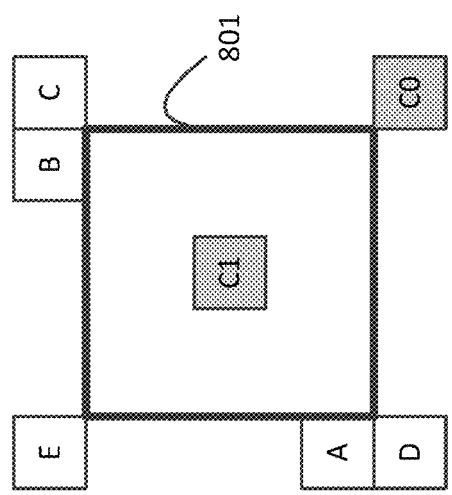
FIG. 8 shows examples for spatial and temporal candidates for a current block according to some embodiments of the disclosure.

In the merge mode, merge candidates may be formed based on motion information from either spatial or temporal neighboring blocks of a current block. Referring to FIG. 8, examples of spatial and temporal merge candidates (or positions for the spatial and temporal merge candidates) are shown for a current block (801) in a current picture according to some embodiments of the disclosure. The current block (801) can be coded in the merge mode. The positions include A, B, C, D, and E. For purposes of brevity, the spatial merge candidates associated with spatial neighboring blocks located at the positions A, B, C, D, and E can also be referred to using the respective positions. The spatial merge candidates may be sequentially checked into a merge candidate list. In an example, for each of the spatial merge candidates, availability of the respective spatial merge candidate is checked according to an order, such as {A, B, C, D, E} or another ordering. For example, if a spatial neighboring block located at the checked position is intra predicted, is outside the current picture, a current slice, a current tile, or the like, the corresponding spatial merge candidate is considered to be unavailable. A pruning operation can be performed to remove one or more duplicated spatial merge candidates from the merge candidate list. In an example, up to four spatial merge candidates can be derived from the spatial neighboring blocks located at the positions A, B, C, D, and E.

In some embodiments, after including spatial merge candidates into the merge candidate list, one or more temporal merge candidates are checked into the merge candidate list. For example, a collocated block of the current block is identified in a specified reference picture. Referring to FIG. 8, the collocated block in the specified reference picture of the current block (801) can have the same position coordinates (e.g., x and y coordinates) as the current block (801). A temporal merge candidate can be from a temporal neighboring block at a C0 position of the collocated block. If the temporal neighboring block at the C0 position is not coded in an inter mode or is not available, a temporal merge candidate can be from a temporal neighboring block at a C1 position of the collocated block. The temporal neighboring block at the C1 position can be collocated near or at a center position of the current block (801). According to some embodiments, additional merge candidates in the merge candidate list can include combined bi-predictive candidates and/or zero motion vector candidates.

A skip mode can be used for a current block indicating that the motion information of the current block is inferred instead of explicitly signaled and that a prediction residual (or residual data) is zero (i.e., no transform coefficients are transmitted). At the beginning of each CU in an inter-picture prediction slice, a skip flag (e.g., skip_flag) may be signaled that implies one or more of the following: (i) the CU contains one PU (e.g., 2N×2N); (ii) the merge mode is used to derive the motion information; and (iii) no residual data is transmitted in a video bitstream.

According to some embodiments, sub-CU modes are enabled as additional merge candidates. In some embodiments, no additional syntax element is used to signal the sub-CU modes. In some embodiments, two additional merge candidates are added to the merge candidates list of each CU to represent an alternative temporal motion vector prediction (ATMVP) mode and a spatial-temporal motion vector prediction (STMVP) mode.

A sequence parameter set may indicate a number of merge candidates in a merge candidate list. For example, up to seven merge candidates may be used in the merge candidate list if a sequence parameter set indicates that an ATMVP mode and a STMVP mode are enabled. Encoding logic of the additional merge candidates may be the same as for the other merge candidates in the merge candidate list, which results in, for each CU in a P slice (a predictive slice) or a B slice (a bi-directionally predictive slice), two more rate-distortion (RD) checks being performed for the two additional merge candidates. In an example, an order of the merge candidates is {A, B, C, D, an ATMVP candidate, a STMVP candidate, E} (when the merge candidates in the merge candidate list are less than 6), temporal merge candidates, combined bi-predictive candidates, and zero motion vector candidates. A merge candidate in the merge candidate list may be referenced by a merge index. In some embodiments, all bins of the merge index are context coded by context-adaptive binary arithmetic coding (CABAC). In an example, a maximum number of merge candidates is 7. In other embodiments, only the first bin is context coded and the remaining bins are context by-pass coded.

Figure 9:
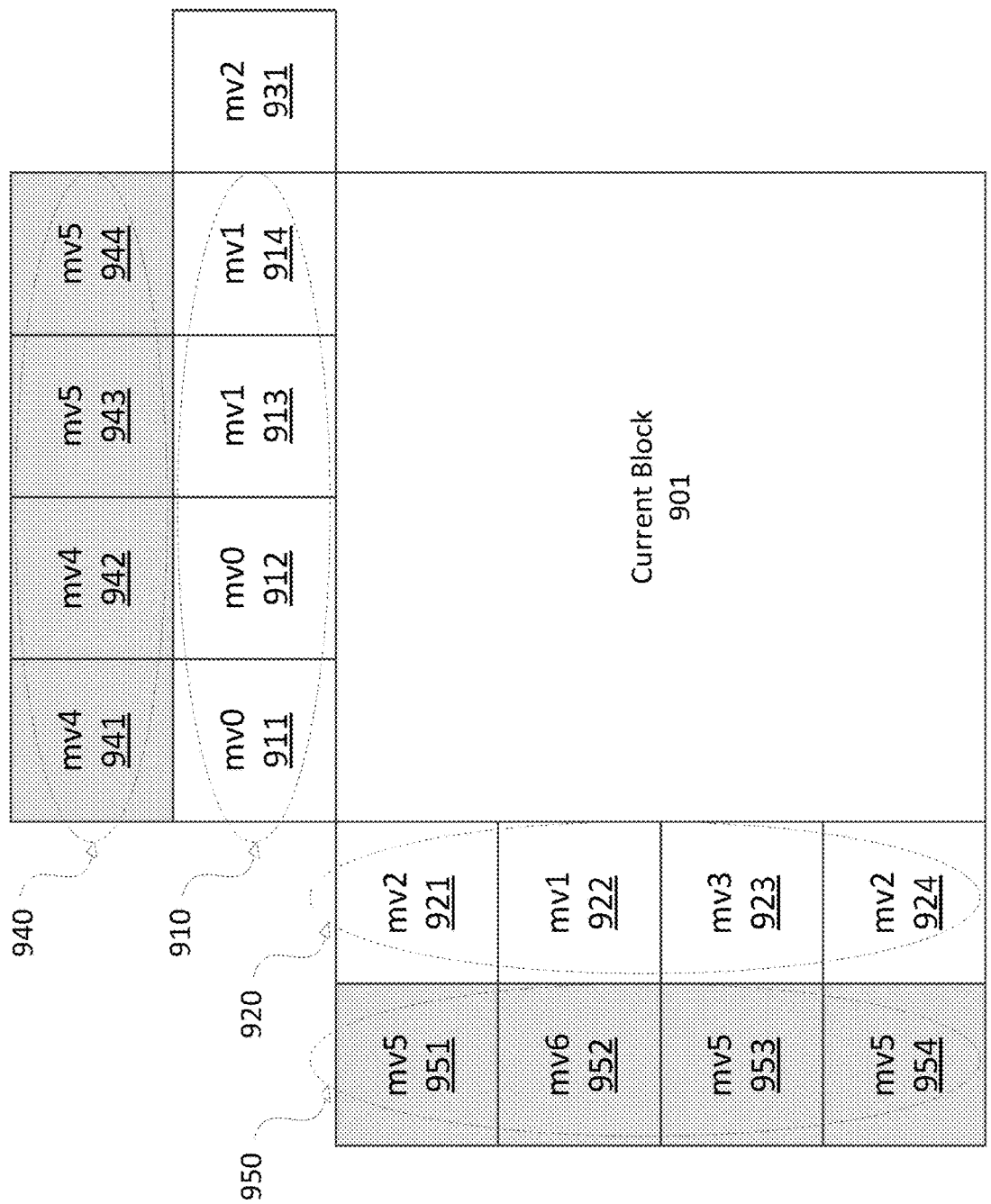
FIG. 9 shows an example of a current block surrounded by various blocks according to an embodiment of the disclosure.

According to some embodiments, candidate motion vectors are searched from previously coded blocks, for example, with a step size of 8×8 blocks. FIG. 9 illustrates a current block (901) surrounded by 8×8 blocks. Nearest spatial neighbors are category 1 candidates, and include an immediate top row (910) (i.e., the immediate top row (910) including blocks (911)-(914) that are associated with motion vectors mv0 and mv1, respectively), an immediate left column (920) (i.e., the immediate left column (920) including blocks (921)-(924) that are associated with motion vectors mv1, mv2, and mv3, respectively), and an immediate top-right corner block (931) that is associated with a motion vector mv2. Category 2 candidates may include outer region blocks away from a current block boundary and blocks that are collocated with the current block (901) in a previously coded picture. The category 2 candidates may include a maximum of three candidates. In FIG. 9, the category 2 candidates may be selected from an outer top row (940) (i.e., the outer top row (940) including blocks (941)-(944) that are associated with motion vectors mv4 and mv5, respectively) and an outer left column (950) (i.e., the outer left column (950) including blocks (951)-(954) that are associated with motion vectors mv5 and mv6, respectively). Motion vectors associated with the neighboring blocks, such as the nearest spatial neighbors, the outer region blocks, and the blocks that are collocated with the current block (901), that are predicted from different reference pictures or are intra coded may be pruned from the merge candidate list. Remaining motion vectors may be each assigned a weight. The weight may be related to a distance of the respective block to the current block (901). As an example, referring to FIG. 9, the merge candidate list may include the following category 1 candidates: mv1, mv0, mv2, and mv3. The merge candidate list may further include the following category 2 candidates: mv5, mv6, and mv4.

Figure 10:
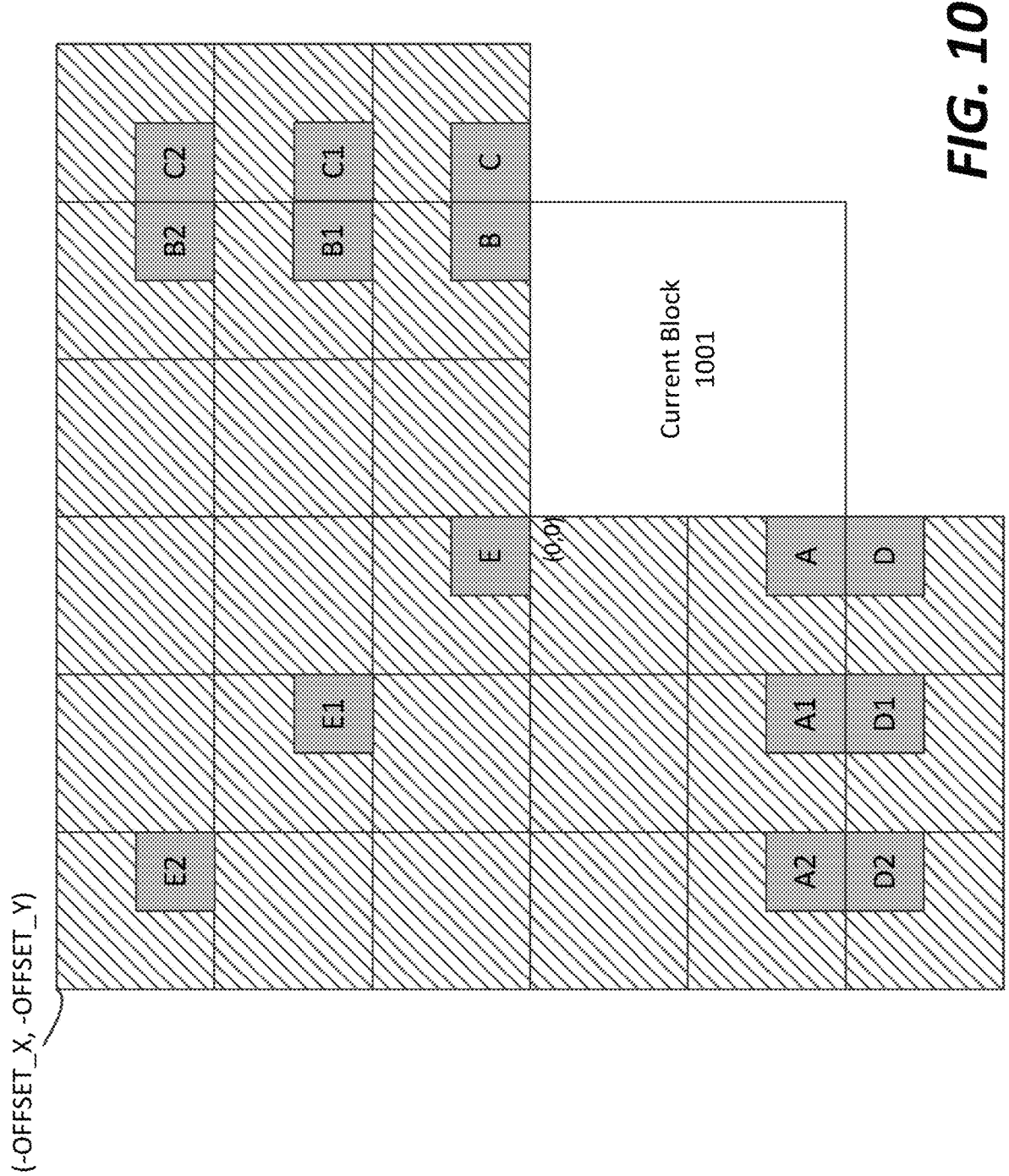
FIG. 10 shows an example of a current block surrounded by various blocks according to an embodiment of the disclosure.

According to some embodiments, an extended merge mode includes additional merge candidates that are associated with blocks that are not immediately next to the current block. The additional merge candidates may be in the left, top, left bottom, top right, and top left directions with respect to the current block. In an example, a maximum number of merge candidates is 10. FIG. 10 illustrates a current block (1001) surrounded to the left, bottom left, top left, top, and top right by blocks having diagonal line pattern. The blocks may include neighboring blocks A, B, C, D, and E, which correspond to neighboring blocks A, B, C, D, and E, respectively, in FIG. 8.

In FIG. 10, a top left corner of a block E2 may have an offset of (−offset_x, −offset_y) with respect to a top left corner (0, 0) of the current block (1001). In an example, the offset_x and the offset_y are 48.

In an example, additional top candidates are associated with additional top blocks, such as blocks B1 and B2. The block B1 can have an offset of 16 in a vertical direction compared to the block B. Further, the block B2 can have an offset of 16 in the vertical direction compared to the block B1. In an example, additional top right candidates are associated with additional top right blocks, such as blocks C1 and C2. The block C1 can have an offset of 16 in the vertical direction compared to the block C. Further, the block C2 can have an offset of 16 in the vertical direction compared to the block C1.

Similarly, in an example, additional left candidates are associated with additional left blocks, such as blocks A1 and A2. The block A1 can have an offset of 16 in a horizontal direction compared to the block A. Further, the block A2 can have an offset of 16 in the horizontal direction compared to the block A1. In an example, additional bottom left candidates are associated with additional bottom left blocks, such as blocks D1 and D2. The block D1 can have an offset of 16 in the horizontal direction compared to the block D. Further, the block D2 can have an offset of 16 in the horizontal direction compared to the block D1.

In an example, additional top left candidates are associated with additional top left blocks, such as blocks E1 and E2. The block E1 can have an offset of 16 in both the horizontal and vertical directions compared to the block E. Further, the block E2 can have an offset of 16 in both the horizontal and vertical directions compared to the block E1.

The above candidates may be checked in an order from the blocks closest to the current block (1001) to the blocks farthest from the current block (1001). For example, an order of candidates is A, B, C, D, E, A1, B1, C1, D1, E1, A2, B2, C2, D2, and E2.

According to some embodiments, motion information of previously coded blocks of a current block can be stored in a history-based motion vector prediction (HMVP) buffer (also referred to as a history buffer) to provide more motion vector prediction (MVP) candidates. The HMVP buffer may include multiple MVP candidates, and may be maintained during an encoding/a decoding process. In an example, the HMVP buffer can include a MVP candidate. The HMVP buffer can be used in any suitable encoder and/or decoder.

In various embodiments, a coding block can be coded in one of a plurality of inter prediction directions, such as a uni-directional prediction including a forward uni-directional prediction and a backward uni-directional prediction, a bi-directional prediction, or the like. In an embodiment, the coding block is coded using a forward uni-directional prediction, and thus, motion information for the coding block includes a first MV, a first reference index, and prediction direction (e.g., an indicator indicating the forward uni-directional prediction), and/or the like. The first reference index can indicate a first reference picture in a first reference list0 used to predict the coding block. In an embodiment, the coding block is coded using a bi-directional prediction, and thus, the motion information for the coding block includes a first MV, a first reference index associated with the first MV, a second MV, a second reference index associated with the second MV, and an indicator indicating the bi-directional prediction, and/or the like. The first reference index and the second reference index indicate a first reference picture in a first reference list0 and a second reference picture in a second reference list1 to predict the coding block, respectively.

In some embodiments, the HMVP buffer may operate in a first-in-first-out (FIFO) principle, and thus, a piece of motion information that is stored first in the HMVP buffer is the first to be removed from the HMVP buffer, for example, when the HMVP buffer is full. The most recent stored motion information may be considered first (e.g., used as a predictor first) when the HMVP buffer is used during a motion vector prediction process such as in a merge mode or in an AMVP mode. In some examples, current motion information of the current block may not be most similar to the most recent stored motion information in the HMVP buffer. For example, the current motion information can be most similar to motion information that has been frequently used in predicting certain previously coded blocks. Therefore, selecting at least one MVP candidate for the current block based on frequencies that multiple pieces of motion information are used to predict the previously coded blocks can be advantageous in some embodiments of video coding.

In some embodiments, a pruning process can be applied when adding a new piece of motion information into the HMVP buffer where the new piece of motion information can include a new motion vector, a new reference index that indicates a new reference picture, a new indicator indicating a new inter prediction direction, and/or the like. For example, the new piece of motion information can be compared with existing entries in the HMVP buffer where the existing entries can include existing motion vectors, existing reference indices, existing indicators, and/or the like. When the new piece of motion information is different from the existing entries in the HMVP buffer, the new piece of motion information is added to the HMVP buffer. Otherwise, the new piece of motion information is not added to the HMVP buffer. In an embodiment, when one of the new motion vector, the new reference index, and the new indicator is different from the existing motion vectors, reference indices, and indicators, the new piece of motion information is different from the existing entries in the HMVP buffer. In an example, the new MV is different from the existing motion vectors in the HMVP buffer when the new MV is not identical to any of the existing motion vectors or when a difference between the new MV and each of the existing motion vectors is larger than a threshold, such as a pixel size (or a 1-pel) of the current block. Alternatively, the new MV is considered not to be different from the existing motion vectors in the HMVP buffer when the difference between the new MV and each of the existing motion vectors is within the threshold. The pruning process described above is applicable to a HMVP buffer that stores any suitable motion information, including motion vectors, motion vector predictors, reference indices, indicators indicating inter prediction directions, and the like, for the current block.

Various modes can be applied in coding a current block using inter prediction. The various modes can include but are not limited to a merge mode, an extended merge mode, and an AMVP mode as described above. A skip mode can use a merge mode to derive motion information for the current block and does not code residual data, and thus, the skip mode can be treated as a special case for the merge mode. For purpose of brevity, a merge candidate used in a merge mode or an extended merge mode and a motion vector predictor candidate used in an AMVP mode can be referred to as a motion vector prediction (MVP) candidate. In addition, a MVP candidate list stores at least one MVP candidate that can be used in inter prediction, such as in a merge mode, an AMVP mode, or the like.

According to aspects of the disclosure, in video coding (e.g., video decoding or video encoding) using inter prediction to reconstruct a current block in a current picture, at least one MVP candidate in a MVP candidate list for the current block can be selected from a HMVP buffer that includes multiple entries storing multiple pieces of motion information. Each entry can store a piece of motion information including a motion vector of a previously coded block. According to aspects of the disclosure, the at least one MVP candidate to be included in the MVP candidate list can be selected from the HMVP buffer based on frequencies that the multiple pieces of motion information are used in predicting the previously coded blocks. Further, a current piece of motion information of the current block can be determined based on the MVP candidate list, and at least one sample of the current block can be reconstructed based on the current piece of motion information. In some embodiments, the HMVP buffer further stores a value indicating the frequency of each of the multiple pieces of motion information. The HMVP buffer can be constructed using any suitable methods and include motion information of any suitable blocks, such as the blocks described with reference to FIGS. 1 and 8-10.

As described above, the HMVP buffer includes the multiple pieces of motion information. According to a first aspect of the disclosure, the HMVP buffer can include multiple entries storing a same one of the multiple pieces of motion information used to predict multiple ones of the previously coded blocks. Therefore, the multiple ones of the previously coded blocks have the same one of the multiple pieces of motion information, such as an identical motion vector, an identical reference picture, an identical inter prediction direction, and/or the like. The frequencies that the multiple pieces of motion information are used in predicting the previously coded blocks can be determined based on numbers of occurrences of the multiple pieces of motion information in the HMVP buffer. In various examples, the multiple pieces of motion information in the HMVP buffer are not pruned.

FIG. 11A shows an example of a HMVP buffer (1110) according to an embodiment of the disclosure. In the FIG. 11A example, the HMVP buffer (1110) includes 8 entries at 8 positions [0]-[7]. The entries [0]-[7] can be stored chronologically as the previously coded blocks are predicted. The positions [0]-[7] can indicate a temporal order (also referred to as a chronological order) that the entries [0]-[7] are stored and appear in the HMVP buffer (1110). Accordingly, in various examples, the entry [0] is from the first one of the previously coded blocks, and thus, is the first one to be stored and appears as a first entry (also referred to as an oldest entry) in the HMVP buffer (1110). The entry [7] is from the most recently coded block, and thus, is stored most recently and appears as a last entry (also referred to as a most recent entry or a newest entry) in the HMVP buffer (1110). The entry [0] and the entry [7] are at a first position (i.e., the position [0]) and a last position (i.e., the position [7]) of the HMVP buffer (1110), respectively.

In an example, when a new piece of motion information including a new motion vector, is added to a HMVP buffer that is not full, current entries in the HMVP buffer can shift one position towards a first position of the HMVP buffer, and the new motion information is stored as a most recent entry at a last position of the HMVP buffer. In an example, when the HMVP buffer is full and a first one of the current entries is removed, the remaining entries of the HMVP buffer are shifted one position towards the first position, and the new motion information is stored as the most recent entry at the last position, such as the position [7] in FIG. 11A.

In various examples, each piece of motion information in the respective entry includes a motion vector of the respective previously coded block. In the FIG. 11A example, the entry [7] stores the most recently used motion vector (2, 0) (i.e., the last used motion vector), and the entry [0] stores the first used motion vector (0, 0). The entries [0], [2], and [4] store a motion vector (0, 0) used to predict 3 previously coded blocks. In addition, the entries [1] and [6] store another motion vector (2, 1) used to predict 2 other previously coded blocks. Additional motion information, such as reference indices, can also be stored in the entries [0]-[7], respectively. In the descriptions with reference to FIGS. 11A-11B, the additional motion information, such as a reference index indicating a reference picture, and an indicator indicating an inter prediction direction in the entries [0], [2], and [4] are identical. Similarly, the additional motion information in the entries [1] and [6] are identical.

Therefore, the HMVP buffer (1110) includes 5 different pieces of motion information represented by 5 motion vectors (0, 0), (2, 1), (2, 0), (0, 5), and (−1, −1), and thus, the piece of motion information can also be referred to using the respective motion vector.

According to a first embodiment of the first aspect, the at least one MVP candidate can be selected as a subset of the multiple pieces of motion information with largest ones of the numbers of occurrences in the HMVP buffer. For example, most frequently used pieces of motion information in the HMVP buffer are selected first to be included in the MVP candidate list. Accordingly, among the entries in the HMVP buffer, a piece of motion information with a largest number of occurrences is first selected followed by another piece of motion information with a second largest number of occurrences, and the like. When a plurality pieces of motion information has an identical number of occurrences, the at least one MVP candidate can be selected based on a chronological order that the plurality pieces of motion information is stored in the HMVP buffer. In this regard, the at least one MVP candidates can be selected based on the positions of the plurality pieces of motion information in the HMVP buffer. In an example, when a first of the plurality pieces of motion information is stored more recently than a second of the plurality pieces of motion information, the first of the plurality pieces of motion information is selected prior to the second of the plurality pieces of motion information.

FIG. 11B shows the 5 motion vectors (0, 0), (2, 1), (2, 0), (0, 5), and (−1, −1) in a second row of a table and the respective numbers of occurrences in the HMVP buffer (1110) in a third row where the 5 motion vectors represent the 5 different pieces of motion information. A first row indicates a chronological order that the 5 motion vectors are stored in the HMVP buffer (1110). In the example illustrated in FIG. 11B, the first row indicates the most recent appearances of the 5 motion vectors in the HMVP buffer (1110) by using the most recent positions of the 5 motion vectors. According to the first embodiment of the first aspect, when selecting the at least one MVP candidate to be included in the MVP candidate list, a following order can be used: {(0, 0), (2, 1), (2, 0), (0, 5), (−1, −1)}. The motion vector (0, 0) has the largest (i.e., 3) number of occurrences in the HMVP buffer, and thus, is selected first, followed by the motion vector (2, 1) having the second largest (i.e., 2) number of occurrences in the HMVP buffer. Remaining motion vectors (2, 0), (0, 5), (−1, −1) have the number of occurrences of 1. The positions of the remaining motion vectors (2, 0), (0, 5), (−1, −1) are 7, 5, and 3 in the HMVP buffer (1110). Therefore, the motion vector (2, 0) is selected prior to the motion vector (0, 5), and the motion vector (0, 5) is selected prior to the motion vector (−1, −1).

According to a second embodiment of the first aspect, the HMVP buffer includes a first set of the multiple pieces of motion information where the number of occurrences of each piece of motion information in the first set is larger than a non-negative integer N, such as 0, 1, 2, and or like. Accordingly, the at least one MVP candidate can be selected from the first set. In some examples, the at least one MVP candidate can further be selected from the first set based on a chronological order that entries in the first set are added to the HMVP buffer. Further, when a number of the first set is less than a number of the at least one MVP candidate, one or more pieces of motion information from remaining pieces of the multiple pieces of motion information is selected, for example, based on a chronological order that the remaining pieces of the multiple pieces of motion information are added to the HMVP buffer.

Referring to FIG. 11A and FIG. 11B, the numbers of occurrences of the motion vectors (0, 0), (2, 1), (2, 0), (0, 5), (−1, −1) are 3, 2, 1, 1, and 1, respectively. In an example, N is 1, and thus, the first set includes the two motion vectors (0, 0) and (2, 1) and the remaining motion vectors include the motion vectors (2, 0), (0, 5), and (−1, −1). According to the second embodiment of the first aspect, when selecting the at least one MVP candidate to be included in the MVP candidate list, a following order can be used: {(2, 1), (0, 0), (2, 0), (0, 5), (−1, −1)}. In this example, the at least one MVP candidate are selected from the first set based on a chronological order that the two motion vectors (0, 0) and (2, 1) are added to the HMVP buffer, and thus, the motion vector (2, 1) is selected prior to the motion vector (0, 0) because the motion vector (2, 1) is stored more recently than the motion vector (0, 0). Similarly, the motion vectors (2, 0) is selected prior to the motion vector (0, 5), and the motion vector (0, 5) is selected prior to the motion vector (−1, −1).

According to a third embodiment of the first aspect, M most recent entries of the HMVP buffer include M most recently stored pieces of motion information in the HMVP buffer and M is a positive integer.

In a first example of the third embodiment, the at least one MVP candidate can be selected as a subset of the multiple pieces of motion information with largest numbers of occurrences in the M most recent entries. Similarly, when a plurality pieces of motion information in the M most recent entries has an identical piece of motion information, the at least one MVP candidate can be selected based on a chronological order that the plurality pieces of motion information is stored in the HMVP buffer, such as described above, and thus, detailed descriptions are omitted for purpose of brevity. In some examples, when a number of the at least one MVP candidate is larger than a number of the M most recent entries, one or more additional pieces of motion information can be selected from remaining entries in the HMVP buffer based on a chronological order that remaining entries are added to the HMVP buffer. The remaining entries are stored in the HMVP buffer prior to the M most recent entries.

Referring to FIG. 11A, when M is 6, the 6 most recently stored pieces of motion information in the HMVP buffer (1110) are stored in 6 most recent entries, i.e., the entries [2]-[7]. The 6 most recent entries include 5 different motion vectors (0, 0), (2, 0), (2, 1), (0, 5), and (−1, −1), and numbers of occurrences of the 5 motion vectors (0, 0), (2, 0), (2, 1), (0, 5), and (−1, −1) in the 6 most recent entries are 2, 1, 1, 1, and 1, respectively. According to the first example of the third embodiment, when selecting the at least one MVP candidate to be included in the MVP candidate list, a following order can be used: {(0, 0), (2, 0), (2, 1), (0, 5), (−1, −1)}.

According to a second example of the third embodiment, the at least one MVP candidate can be selected from the M most recent entries based on the numbers of occurrences of the M most recently stored pieces of motion information in the HMVP buffer (1110). Referring to FIG. 11A, when M is 2, the 2 most recently stored pieces of motion information in the HMVP buffer (1110) are stored in 2 most recent entries, i.e., the entries [6]-[7]. The 2 most recent entries include 2 different motion vectors (2, 0) and (2, 1), and the number of occurrences of the motion vectors (2, 0) and (2, 1) in the HMVP buffer (1110) are 1 and 2, respectively. Accordingly, the motion vector (2, 1) is selected prior to the motion vector (2, 0) because the number of occurrences of the motion vector (2, 1) is larger than the number of occurrences of the motion vector (2, 0). In an example, additional one or more MVP candidates can be selected from the remaining entries based on a chronological order that that the remaining entries are added to the HMVP buffer. Therefore, according to the second example of the third embodiment, a following order can be used: {(2, 1), (2, 0), (0, 5), (0, 0), (−1, −1)} to select the at least one MVP candidate for the MVP candidate list.

According to a third example of the third embodiment, the at least one MVP candidate can be selected from a first set of the M most recently stored pieces of motion information where each piece of motion information in the first set appears more than N times in the M most recent entries and N is a non-negative integer. Similarly, when a plurality pieces of motion information in the first set have an identical number of occurrences in the M most recent entries, the at least one MVP candidate can be selected based on a chronological order that the plurality pieces of motion information is stored in the HMVP buffer, similarly as described above, and thus, detailed descriptions are omitted for purpose of brevity. In some examples, when a number of the at least one MVP candidate is larger than a number of the first set, one or more additional pieces of motion information can be selected from other pieces of the multiple pieces of motion information in the HMVP buffer that are not included in the first set based on a chronological order that the other pieces are added to the HMVP buffer.

Referring to FIG. 11A, as described above, when M is 6 and N is 1, the 6 most recent entries includes 5 different motion vectors (2, 0), (2, 1), (0, 5), (0, 0), and (−1, −1) and number of occurrences of the 5 motion vectors in the 6 most recent entries are 1, 1, 1, 2, and 1. According to the third example of the third embodiment, a first set of the 6 most recently stored pieces of motion information includes the motion vector (0, 0) that occurs more than 1 time in the 6 most recent entries, and thus, the at least one MVP candidate can be selected from the first set including the motion vector (0, 0). Further, other pieces of the multiple pieces of motion information include the 4 different motion vectors (2, 0), (2, 1), (0, 5), and (−1, −1). When the positions of the motion vectors (2, 0), (2, 1), (0, 5), and (−1, −1) are considered, a following order can be used to select the at least one MVP candidate of the MVP candidate list: {(0, 0), (2, 0), (2, 1), (0, 5), (−1, −1)}.

In a fourth example of the third embodiment, the at least one MVP candidate in the MVP candidate list can be selected from a second set of the M most recently stored pieces of motion information. Each piece of motion information in the second set occurs more than N times in the HMVP buffer. Similarly, when a plurality pieces of motion information in the second set has an identical number of occurrences in the HMVP buffer, the at least one MVP candidate can be selected based on a chronological order in which the plurality pieces of motion information is stored in the HMVP buffer, similarly as described above. In some examples, when a number of the at least one MVP candidate is larger than a number of the second set, one or more additional pieces of motion information can be selected from other pieces of the multiple pieces of motion information based on a chronological order that the other pieces are added to the HMVP buffer.

Referring to FIG. 11A, when M is 2 and N is 1, as described above, the 2 most recent entries include the 2 motion vectors (2, 0) and (2, 1) that have the numbers of occurrences in the HMVP buffer (1110) being 1 and 2, respectively. According to the fourth example of the third embodiment, a second set of the 2 most recently stored pieces of motion information includes the motion vector (2, 1) that occurs more than 1 time in the HMVP buffer (1110), and thus, the at least one MVP candidate in the MVP candidate list can be selected from the second set including the motion vector (2, 1). Further, other pieces of the multiple pieces of motion information include the motion vectors (2, 0), (0, 5), (0, 0), and (−1, −1). When the positions of the motion vectors (2, 0), (0, 5), (0, 0), and (−1, −1) are considered, a following order can be used to select the at least one MVP candidate of the MVP candidate list: {(2, 1), (2, 0), (0, 5), (0, 0), and (−1, −1)}.

According to a second aspect of the disclosure, the HMVP buffer can store a value indicating the frequency of each of the multiple pieces of motion information as described above. In various examples, the multiple entries in the HMVP buffer are pruned, and the multiple pieces of motion information are different. Accordingly, the at least one MVP candidate in the MVP candidate list can be selected based on the frequencies of the multiple pieces of motion information.

According to a first embodiment of the second aspect, the at least one MVP candidate in the MVP candidate list can be selected as a subset of the multiple pieces of motion information with largest ones of the frequencies in the HMVP buffer. For example, a piece of motion information in the HMVP buffer is selected first when the frequency of the piece of motion information is the largest among the frequencies, followed by another piece of motion information with the second largest of the frequencies, and the like. When a plurality pieces of motion information has an identical one of the frequencies, the at least one MVP candidate can be selected based on a chronological order that the plurality pieces of motion information is stored in the HMVP buffer, similarly as describe above.

FIG. 12 shows an example of a HMVP buffer (1210) according to an embodiment of the disclosure. In the FIG. 12 example, the HMVP buffer (1210) includes 8 entries at 8 positions [0]-[7]. The entries [0]-[7] can be stored and/or updated chronologically as the previously coded blocks are predicted. Therefore, the positions [0]-[7] in the HMVP buffer (1210) indicate a chronological order that the entries [0]-[7] are stored or updated and appear in the HMVP buffer (1210). Accordingly, in various examples, the entry [7] from the most recently coded block is stored and appears in the HMVP buffer (1310) most recently. On the other hand, the entry [0] is from the first one of the previously coded blocks and is the first stored entry of the entries [0]-[7].

Referring to FIG. 12, the entries [0]-[7] include 8 different pieces of motion information including 8 different motion vectors, as shown in a first row. Referring to FIG. 12, the 8 pieces of motion information can also be referred to using the respective motion vectors, for example when the reference picture and inter prediction direction for each instance of a motion vector is the same. For example, the piece of motion information stored in the entry [0] can be referred to using the motion vector (0, 3). Frequencies of the 8 motion vectors are shown in a second row. According to the first embodiment of the second aspect, when selecting the at least one MVP candidate to be included in the MVP candidate list, a following order can be used: {(2, 1), (0, 2), (0, 5), (−1, −1), (2, 0), (0, 0), (2, −1), (0, 3)}. For example, the motion vectors (2, 1) and (0, 2) are selected prior to other motion vectors because the frequencies of the motion vectors (2, 1) and (0, 2) are larger than frequencies of the other motion vectors. In addition, the motion vector (2, 1) is selected prior to the motion vector (0, 2) because the motion vector (2, 1) is more recent than the motion vector (0, 2). Similarly, the other motion vectors can be selected according to an order of {(0, 5), (−1, −1), (2, 0), (0, 0), (2, −1), (0, 3)} after selecting the motion vectors (2, 1) and (0, 2).

According to a second embodiment of the second aspect, the at least one MVP candidate in the MVP candidate list can be selected from a first set of the multiple pieces of motion information where the frequency of each piece of motion information in the first set is larger than a non-negative integer N. When a plurality pieces of motion information in the first set has an identical one of the frequencies, the at least one MVP candidate can be selected based on a chronological order that the plurality pieces of motion information is stored in the HMVP buffer, similarly as described above. Further, when a number of the first set is less than a number of the at least one MVP candidate, one or more pieces of motion information from remaining pieces of the multiple pieces of motion information is selected, for example, based on a chronological order that the remaining pieces of the multiple pieces of motion information are added to the HMVP buffer.

Referring again to FIG. 12, when N is 1, according to the second embodiment of the second aspect, a first set of the multiple pieces of motion information includes the motion vectors (2, 1), (0, 5), (−1, −1), and (0, 2) having the frequencies that are larger than 1. The at least one MVP candidate can further be selected based on the positions [6], [5], [3], and [2] of the respective motion vectors (2, 1), (0, 5), (−1, −1), and (0, 2). When a number of the at least one MVP candidate is larger than a number of the first set, one or more of remaining motion vectors in the HMVP buffer (1210) can be selected, for example, based on the positions of the remaining motion vectors in the HMVP buffer (1210). Accordingly, when selecting the at least one MVP candidate to be included in the MVP candidate list, a following order can be used: {(2, 1), (0, 5), (−1, −1), (0, 2), (2, 0), (0, 0), (2, −1), (0, 3)}.

According to a third embodiment of the second aspect, the HMVP buffer can include M most recently stored pieces of motion information in the HMVP buffer. In a first example of the third embodiment, the at least one MVP candidate can be selected as a subset of the multiple pieces of motion information that is most frequently used among the M most recently stored pieces of motion information, that is, the at least one MVP candidate can be selected based on frequencies of the M recently stored pieces of motion information.

Referring to FIG. 12, when M is 4, according to the first example of the third embodiment, the motion vectors (2, 0), (2, 1), (0, 5), and (0, 0) correspond to the most recent positions [4]-[7]. The at least one MVP candidate can be selected from the motion vectors (2, 0), (2, 1), (0, 5), and (0, 0) according to an order of {(2, 1), (0, 5), (2, 0), (0, 0)} based on the frequencies of the motion vectors. The motion vector (2, 0) is selected prior to the motion vector (0, 0) based on the respective positions of the motion vectors (2, 0) and (0, 0). When a number of the at least one MVP candidate is larger than M, one or more of remaining motion vectors in the HMVP buffer (1210) can be selected, for example, based on the positions of the remaining motion vectors in the HMVP buffer (1210). Accordingly, when selecting the at least one MVP candidate to be included in the MVP candidate list, a following order can be used: {(2, 1), (0, 5), (2, 0), (0, 0), (−1, −1), (0, 2), (2, −1), (0, 3)}.

In a second example of the third embodiment, the at least one MVP candidate can be selected from a first set of the M most recently stored pieces of motion information where the frequency of each piece of motion information in the first set is larger than the non-negative integer N. In addition, the at least one MVP candidate can further be selected from the first set based on the positions of the pieces of motion information.

Referring to FIG. 12, when M is 4 and N is 1, a first set of the 4 most recently stored motion vectors (2, 0), (2, 1), (0, 5), and (0, 0) includes the motion vectors (2, 1) and (0, 5). The motion vector (2, 1) can be selected prior to the motion vector (0, 5). Accordingly, when selecting the at least one MVP candidate to be included in the MVP candidate list, a following order can be used: {(2, 1), (0, 5), (2, 0), (0, 0), (−1, −1), (0, 2), (2, −1), (0, 3)}.

In the examples shown in FIG. 12, the 8 different pieces of motion information have 8 different motion vectors. Similar to that described with reference to FIGS. 11A-11B, additional motion information, such as reference indices, can also be stored in the entries [0]-[7], respectively. The descriptions with reference to FIG. 12 can be suitably adapted to other scenarios where the multiple pieces of motion information are different. For example, at least two of the multiple pieces of motion information have identical motion vectors, and reference pictures for the at least two of the multiple pieces of motion information are different.

In various embodiments, when the HMVP buffer stores the values indicating the frequencies of the multiple pieces of motion information, the HMVP buffer can be updated, for example, when the current piece of motion information of the current block is available. When the current piece of motion information is different from the multiple pieces of motion information, the current piece of motion information and a value indicating a frequency of the current piece of motion information in the HMVP buffer can be stored. The frequency can be 1. Alternatively, when the current piece of motion information is identical to or similar to one of the multiple pieces of motion information, the value of the one of the multiple pieces of motion information can be updated to indicate an increase of the frequency of the one of the multiple pieces of motion information by 1. In an example, when the current piece of motion information is added to the HMVP buffer that is full, one of the multiple pieces of motion information with a lowest one of the frequencies can be removed.

In various embodiments, the values to indicate that the frequencies of the multiple pieces of motion information in the HMVP buffer can be reset periodically. In an example, the frequencies are reset, for example, to 1 when the current block is to be coded first in one of: a new coding tree block, a new row of the coding tree block, a new slice of the coding tree block, a new tile of the coding tree block, and a new wavefront parallel processing (WPP) row of the coding tree block. In an embodiment, one of the values to indicate one of the frequencies in the HMVP buffer can be reset, for example, to 1 when the one of the frequencies exceeds a threshold.

In some examples, a current motion vector of a current block may not be most similar to a most recent motion vector stored in a HMVP buffer. For example, the current motion vector can be most similar to one of the motion vectors that have been frequently used in predicting certain previously coded blocks. Therefore, selecting at least one MVP candidate that can be used to predict the current motion vector based on frequencies that motion vectors are used to predict the previously coded blocks can be advantageous in some embodiments of video coding, such as various examples and embodiments described in the disclosure.

Figure 13:
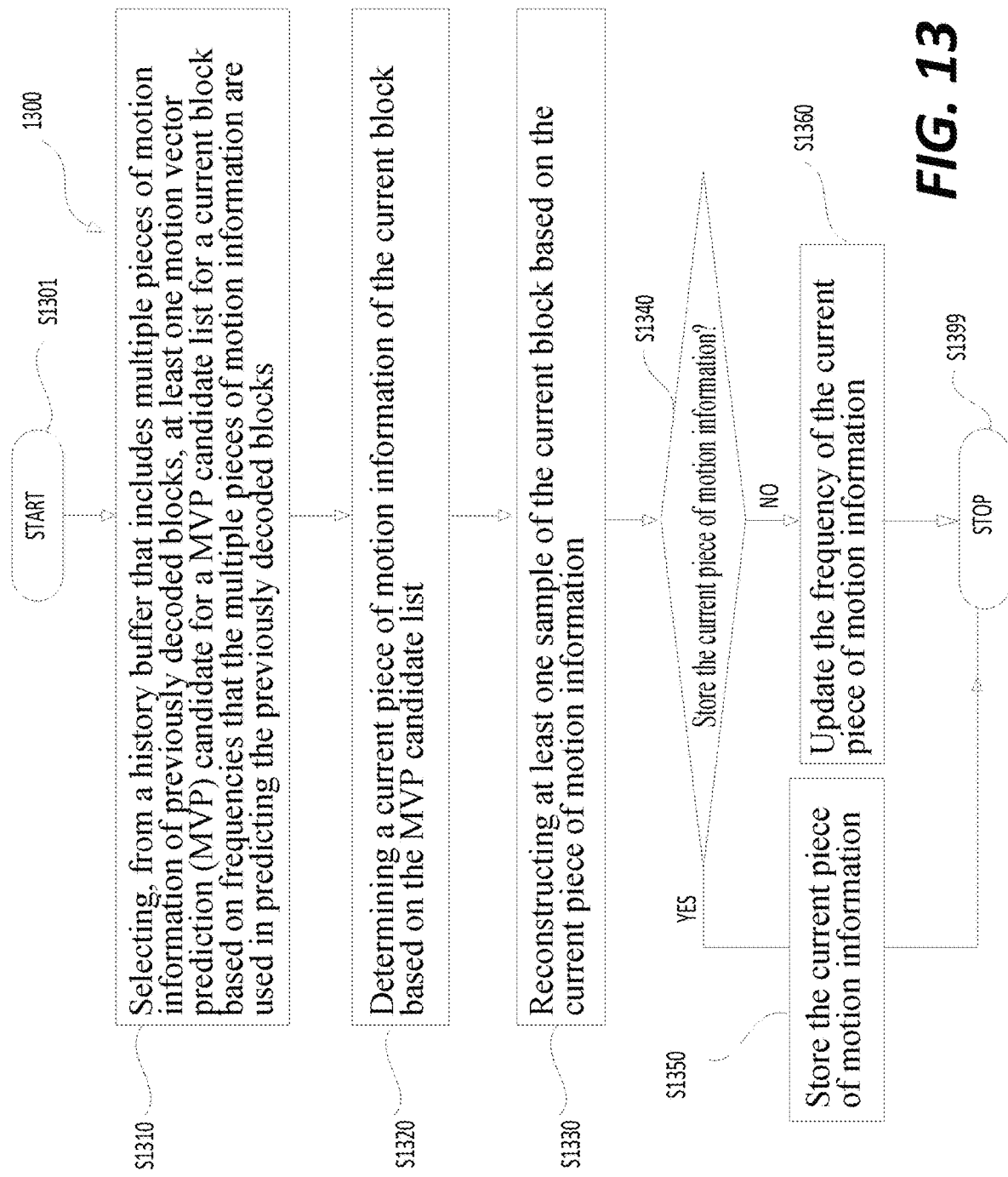
FIG. 13 shows a process according to an embodiment of the disclosure.

FIG. 13 shows a flow chart outlining a process (1300) according to an embodiment of the disclosure. The process (1300) can be used in the reconstruction of a current block coded in inter prediction and to determine at least one MVP candidate of a MVP candidate list for the current block under reconstruction. In various embodiments, the process (1300) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1300) is implemented in software instructions, thus when the processing circuitry executes the software instructions, the processing circuitry performs the process (1300). The process starts at (S1301) and proceeds to (S1310).

At (S1310), at least one MVP candidate to be included in a MVP candidate list for a current block in a current picture can be selected from a HMVP buffer that includes multiple pieces of motion information of previously coded blocks based on frequencies that the multiple pieces of motion information are used in predicting the previously decoded blocks. In an embodiment, the HMVP buffer can include multiple entries storing an identical piece of motion information that is used to predict different previously coded blocks, for example, when pruning operations are not used for the HMBP buffer. The frequencies that the multiple pieces of motion information are used in predicting the previously coded blocks can be determined based on numbers of occurrences of the multiple pieces of motion information in the HMVP buffer, as described above in the first aspect with reference to FIGS. 11A-11B. In an embodiment, the HMVP buffer can store a value indicating the frequency of each of the multiple pieces of motion information, and pruning operations are used for the HMVP buffer, as described above. Accordingly, the at least one MVP candidate in the MVP candidate list can be selected based on the frequencies of the multiple pieces of motion information, as described above in the second aspect with reference to FIG. 12. Step (S1310) can be implemented in any suitable mode of inter prediction, such as a merge mode, an AMVP mode, or the like. The HMVP buffer can be constructed using any suitable methods including or without pruning operations and include motion information of any suitable blocks, such as the blocks described with reference to FIGS. 1 and 8-10. The MVP candidate list can include any suitable number of the at least one MVP candidate.

At (S1320), a current piece of motion information of the current block can be determined based on the constructed MVP candidate list. In an example, the current block is predicted using a merge mode, and the current piece of motion information includes a motion vector selected from the constructed MVP candidate list based on a merge index. In an example, the current block is predicted using an AMVP mode, a motion vector predictor is selected from the MVP candidate list and a motion vector difference is transmitted in a video bitstream. Accordingly, the motion vector of the current block can be calculated based on the obtained motion vector predictor and the motion vector difference.

At (S1330), at least one sample of the current block can be reconstructed based on the current piece of motion information. The at least one sample can be reconstructed based on the determined motion vector and a reference picture.

At (S1340), whether the current piece of motion information is to be stored in the HMVP buffer can be determined. For example, when the HMVP buffer is not pruned, such as described with reference to FIGS. 11A-11B, the current piece of motion information is to be stored in the HMVP buffer. In addition, when the current piece of motion information is different from the multiple pieces of motion information in the HMVP buffer, the current piece of motion information is to be stored in the HMVP buffer. The process (1300) proceeds to (S1350). Otherwise, when the HMVP buffer is pruned and the current piece of motion information is identical or similar to one of the multiple pieces of motion information in the HMVP buffer, the process (1300) proceeds to (S1360).

At (S1350), the current piece of motion information is stored in the HMVP buffer, as described above. Then the process (1300) proceeds to (S1399) and terminates.

At (S1360), the frequency of the current piece of motion information is updated in the HMVP buffer, as described above. Then the process (1300) proceeds to (S1399) and terminates.

The process (1300) can be suitably adapted. For example, (S1340), (S1350), and (S1360) can be implemented before (S1330). The process (1300) can also be suitably adapted for CBs or CUs that are in a B slice.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
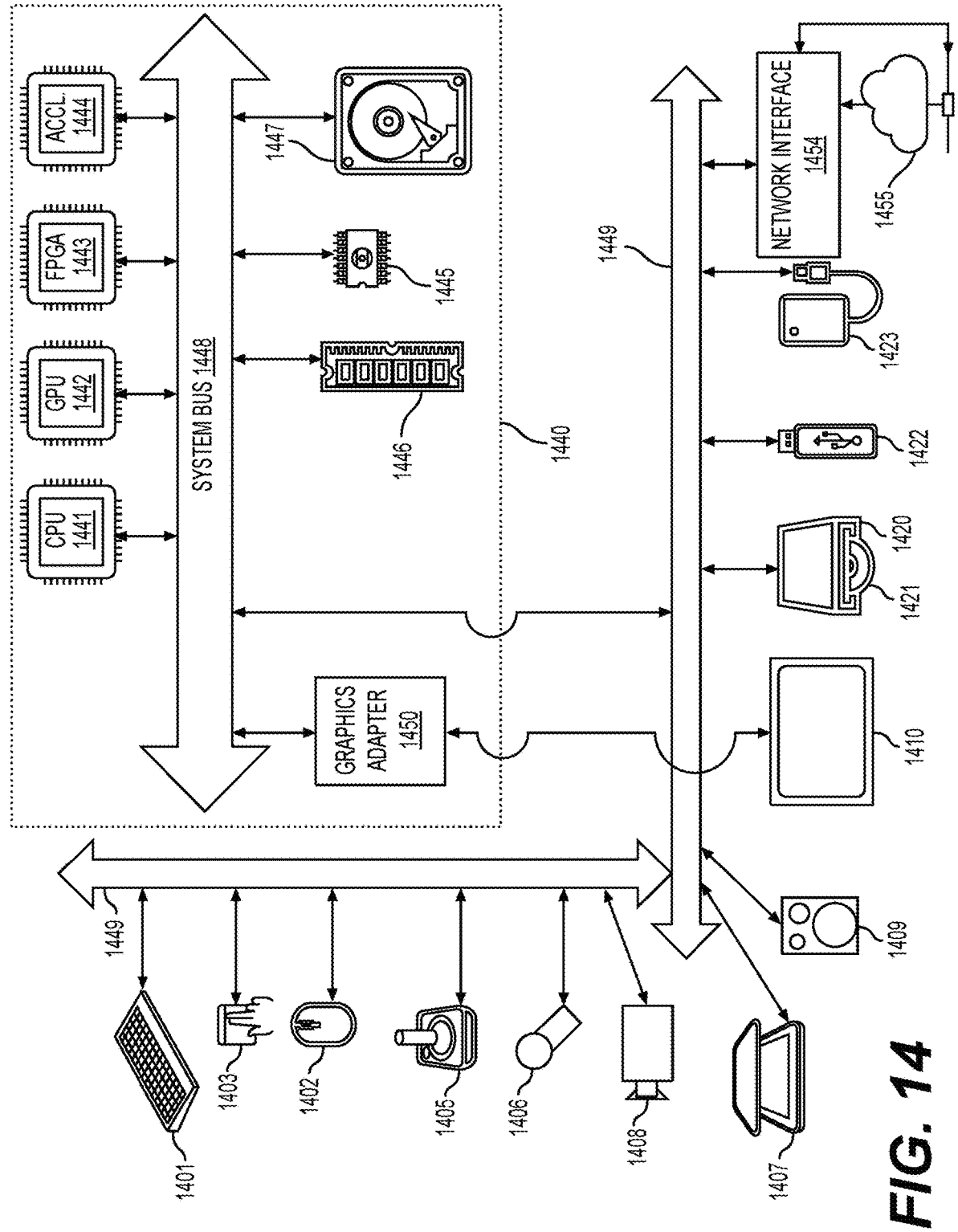
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding

BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
AMVP: Advanced Motion Vector Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   selecting, from a history buffer that includes multiple pieces of motion information of previously decoded blocks, a smaller subset of the multiple pieces of motion information to be included in a MVP candidate list for a current block based on frequencies that the multiple pieces of motion information are used in predicting the previously decoded blocks, the selected smaller subset having multiple pieces of motion information having largest frequencies of use among M pieces of motion information most recently stored in the history buffer, M being a positive integer,
   wherein, in response to a determination that two or more of the multiple pieces of motion information are used at a first frequency in predicting the previously decoded blocks, a first piece of motion information used at the first frequency in predicting the previously decoded blocks being used more recently in a decoding order of decoding the previously decoded blocks than a second piece of motion information used at the first frequency in predicting the previously decoded blocks, the first piece of motion information is selected into the smaller subset of the multiple pieces of motion information in the MVP candidate list prior to selection of the second piece of motion information;
   determining a current piece of motion information of the current block based on the MVP candidate list; and
   reconstructing at least one sample of the current block based on the current piece of motion information.

2. The method of claim 1, wherein:
   the method further includes determining the frequencies based on numbers of occurrences of the multiple pieces of motion information in the history buffer.

3. The method of claim 1, wherein the history buffer stores a value indicating a frequency of each of the multiple pieces of motion information.

4. The method of claim 3, further comprising:
   when the current piece of motion information is different from the multiple pieces of motion information, storing the current piece of motion information and a value indicating a frequency of the current piece of motion information in the history buffer, the frequency being 1; and
   when the current piece of motion information is one of the multiple pieces of motion information, updating the value to indicate an increase of the frequency of the one of the multiple pieces of motion information by 1.

5. The method of claim 4, wherein the storing the current piece of motion information further comprises:
   removing one of the multiple pieces of motion information with a lowest one of the frequencies.

6. The method of claim 3, further comprising:
   resetting the values to indicate that the frequencies of the multiple pieces of motion information in the history buffer are 1 when the current block is to be decoded first in one of: a new coding tree block, a new row of a coding tree block, a new slice of the coding tree block, a new tile of the coding tree block, and a new wavefront parallel processing row of the coding tree block.

7. The method of claim 3, further comprising:
   resetting one of the values to indicate that one of the frequencies in the history buffer is 1 when the one of the frequencies exceeds a threshold.

8. An apparatus, comprising processing circuitry configured to:
   select, from a history buffer that includes multiple pieces of motion information of previously decoded blocks, a smaller subset of the multiple pieces of motion information to be included in a MVP candidate list for a current block based on frequencies that the multiple pieces of motion information are used in predicting the previously decoded blocks the selected smaller subset having multiple pieces of motion information having largest frequencies of use among M pieces of motion information most recently stored in the history buffer, M being a positive integer, wherein, in response to a determination that two or more of the multiple pieces of motion information are used at a first frequency in predicting the previously decoded blocks, a first piece of motion information used at the first frequency in predicting the previously decoded blocks being used more recently in a decoding order of decoding the previously decoded blocks than a second piece of motion information used at the first frequency in predicting the previously decoded blocks, the first piece of motion information is selected into the smaller subset of the multiple pieces of motion information in the MVP candidate list prior to selection of the second piece of motion information;

determine a current piece of motion information of the current block based on the MVP candidate list; and reconstruct at least one sample of the current block based on the current piece of motion information.

9. The apparatus of claim 8, wherein the history buffer stores a value indicating a frequency of each of the multiple pieces of motion information.

* * * * *